US005630274A

United States Patent [19]

Miyazawa et al.

[11] Patent Number: 5,630,274

[45] Date of Patent: May 20, 1997

[54] METHOD OF MAKING AN INK JET RECORDING HEAD

[75] Inventors: Hisashi Miyazawa; Takashi Nakamura; Osamu Nakamura; Shinji Yasukawa; Minoru Usui; Tomoaki Abe; Satoru Hosono; Takahiro Naka, all of Nagano, Japan

[73] Assignee: Seiko Epson Corporation, Tokyo, Japan

[21] Appl. No.: 471,230

[22] Filed: Jun. 6, 1995

Related U.S. Application Data

[62] Division of Ser. No. 997,571, Dec. 28, 1992.

[30] Foreign Application Priority Data

| | | | |
|---|---|---|---|
| Dec. 26, 1991 | [JP] | Japan | 3-345343 |
| Feb. 7, 1992 | [JP] | Japan | 4-22833 |
| Feb. 12, 1992 | [JP] | Japan | 4-25126 |
| Mar. 3, 1992 | [JP] | Japan | 4-45195 |
| Apr. 6, 1992 | [JP] | Japan | 4-84003 |
| Apr. 22, 1992 | [JP] | Japan | 4-103059 |
| Apr. 22, 1992 | [JP] | Japan | 4-103060 |

[51] Int. Cl.[6] .......... B23P 15/00

[52] U.S. Cl. .......... 29/890.1; 347/71

[58] Field of Search .......... 29/840.1, 25.35; 347/71

[56] References Cited

U.S. PATENT DOCUMENTS

| | | |
|---|---|---|
| 4,095,232 | 6/1978 | Cha . |
| 4,439,780 | 3/1984 | DeYoung et al. . |
| 4,599,628 | 7/1986 | Doring et al. . |
| 4,768,266 | 9/1988 | DeYoung . |
| 4,937,589 | 6/1990 | Fagerquist et al. . |
| 5,072,240 | 12/1991 | Miyazawa et al. . |

FOREIGN PATENT DOCUMENTS

| | | |
|---|---|---|
| 0024955 | 9/1979 | European Pat. Off. . |
| 0126649 | 11/1984 | European Pat. Off. . |
| 2257356 | 12/1974 | France . |
| 58119871 | 7/1983 | Japan . |
| 58-119870 | 7/1983 | Japan . |
| 60-8953 | 3/1985 | Japan . |
| 61-283553 | 12/1986 | Japan . |
| 245985 | 10/1990 | Japan . |
| 252625 | 11/1990 | Japan . |
| 3272857 | 4/1991 | Japan . |
| 3073347 | 6/1991 | Japan . |
| 3264360 | 11/1991 | Japan . |
| 3234538 | 1/1992 | Japan . |

OTHER PUBLICATIONS

Patent Abstracts of Japan; Publication No. JP63265646; Abstracts Publication Date Nov. 2, 1988.

Patent Abstracts of Japan; Publication No. JP2220848; Abstracts Publication Date Sep. 4, 1990.

Patent Abstracts of Japan; Publication No. JP2277640; Abstracts Publication Date Jun. 8, 1990.

Patent Abstracts of Japan; Publication No. JP2150354; Abstracts Publication Date Jun. 8, 1990.

Patent Abstracts of Japan; Publication No. 59–162061; Abstracts Publication Date Sep. 12, 1984.

*Primary Examiner*—Irene Cuda

*Attorney, Agent, or Firm*—Sughrue, Mion, Zinn, Macpeak & Seas

[57] ABSTRACT

In an ink jet recording head, after a plate-shaped piezoelectric element is positioned and fixed onto a fixing plate, the piezoelectric element is sliced into a large number of vibrators and the leading ends of the vibrators are embracingly held in positioning holes 33 respectively formed in a top surface of a holding frame and are thus positioned in the surface direction thereof. Further, a cavity unit is positioned and fixed on the top surface of the holding frame.

17 Claims, 10 Drawing Sheets

METHOD OF MAKING AN INK JET RECORDING HEAD

This application is a division of application Ser. No. 07/997,571 filed Dec. 28, 1992, now U.S. Pat. No. 5,517, 225.

BACKGROUND OF THE INVENTION

1. Field of the Invention

The present invention relates to an ink jet recording head for use in an ink jet recording device which ejects drops of ink to thereby form an image and, more particularly, to an ink jet recording head having a mechanism for precisely positioning the respective components of the head.

2. Description of the Related Art

There has been known, from Japanese Patent Unexamined Publication No. Sho 58-119870, etc., an ink jet recording head employing a piezoelectric vibrator which moves in the longitudinal direction to apply pressure to ink stored within a pressure chamber, and the pressurized ink is then jetted out from a nozzle as droplets of ink onto a recording medium.

In the recording head of the above-mentioned type, a large number of piezoelectric vibrators are inserted into guide holes formed in the upper and lower portions of a support member to thereby position and support the respective base end portions and leading end portions thereof. However, in this structure, the piezoelectric vibrators cannot be disposed in a high density arrangement. Also, they may be unevenly in the longitudinal direction thereof, and may be inclined with respect to each other, which makes it impossible to provide a uniform ink jet characteristic.

SUMMARY OF THE INVENTION

The present invention is directed to eliminating the drawbacks found in the above-mentioned known recording heads. Accordingly, it is an object of the invention to provide a new ink jet recording head which is capable of positioning and connecting a plurality of piezoelectric vibrators, as well as various components forming the recording head, with respect to one another with high accuracy.

In attaining the above object, according to the invention, after a plate-shaped piezoelectric element is previously positioned and fixed onto a fixing plate, the piezoelectric element is divided into a plurality of piezoelectric vibrators, and piezoelectric vibrators are held and positioned in the surface direction thereof by a holding device.

According to another aspect of the invention, the outermost piezoelectric vibrators are used as vibrator-positioning members to thereby enhance the working accuracy of the remaining vibrators used for ink jetting. Also, the vibrator-positioning member vibrators are used for positioning the vibrators with respect to the holding device or an ink flow passage substrate.

According to still another aspect of the invention, a pressure chamber in a flow passage substrate is formed in such a manner that both side portions thereof respectively have a plane, and the vibrator-positioning members are respectively opposite to these planar side portions of the ink flow passage substrate, thereby enhancing the positioning accuracy between the ink flow passage forming substrate and the piezoelectric vibrators in the displacement direction thereof.

According to a further aspect of the invention, positioning projections respectively provided on both sides of the fixing plate, which serve as a positioning reference for the piezoelectric vibrators, are used as the positioning portions that position the ink flow passage substrate in the surface direction thereof, so that the piezoelectric vibrators and the ink flow passage substrate can be positioned directly.

DETAILED DESCRIPTION OF THE PREFERRED EMBODIMENT

Figure 1:
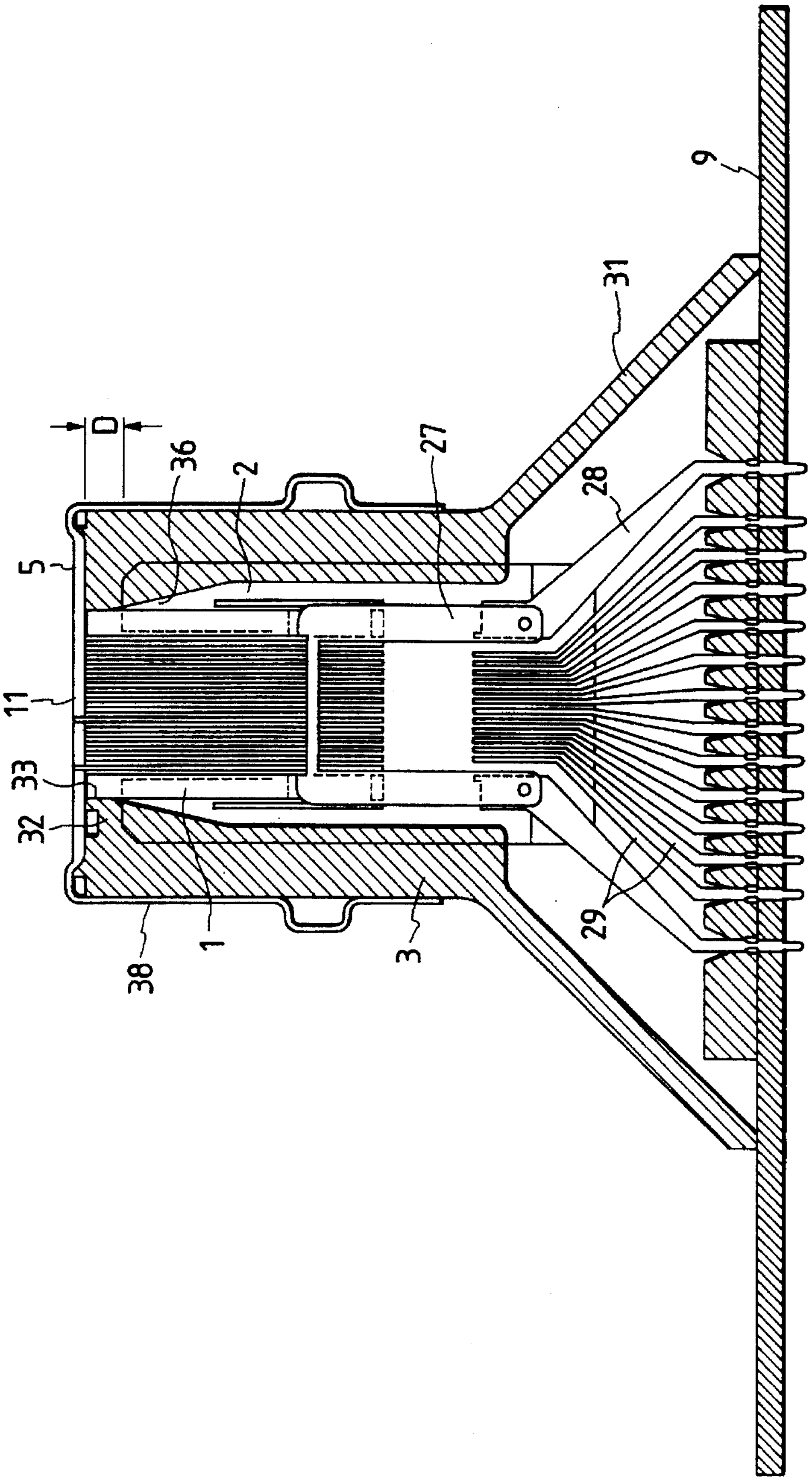
FIG. 1 is a sectional side view of an ink jet recording head according to a first embodiment of the invention.
Figure 2:
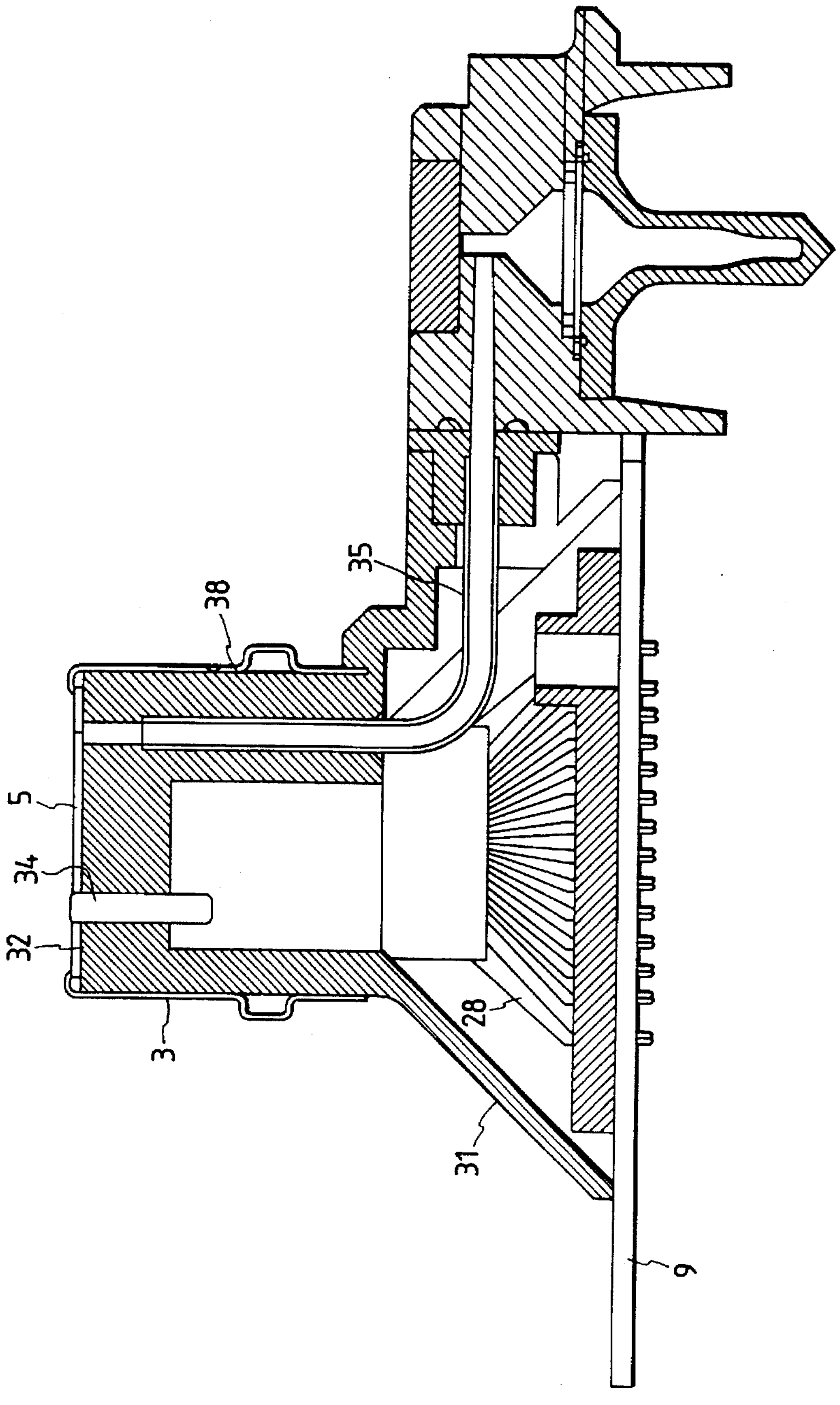
FIG. 2 is a sectional side view of the ink jet recording head, taken from the position of a pin 34.
Figure 3A:
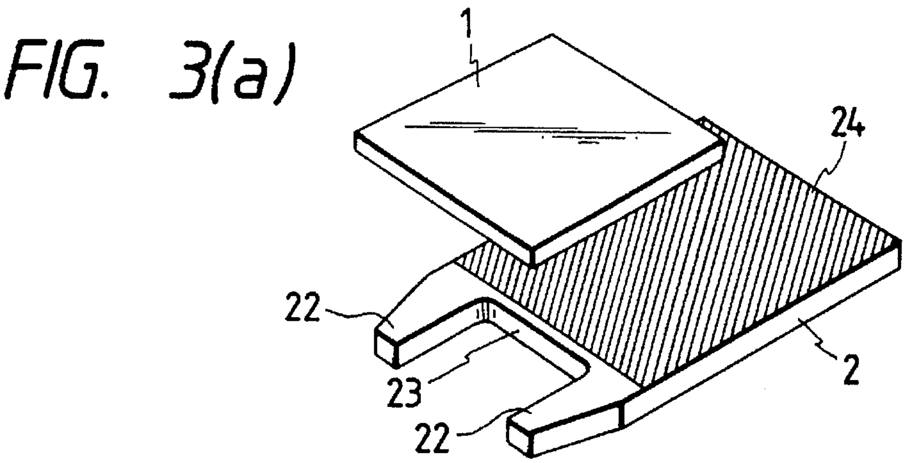
FIGS. 3(*a*) to 3(*d*) are views of a piezoelectric element and a fixing plate, respectively showing steps of producing the piezoelectric vibrators.
Figure 3B:
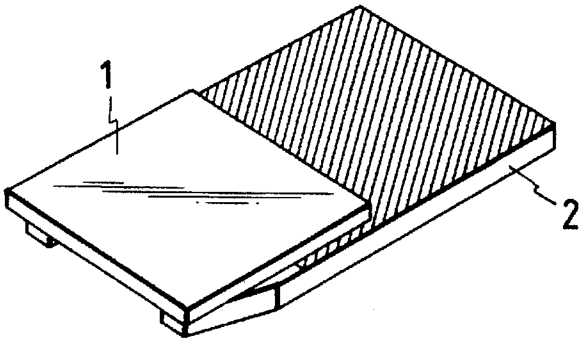
Figure 3C:
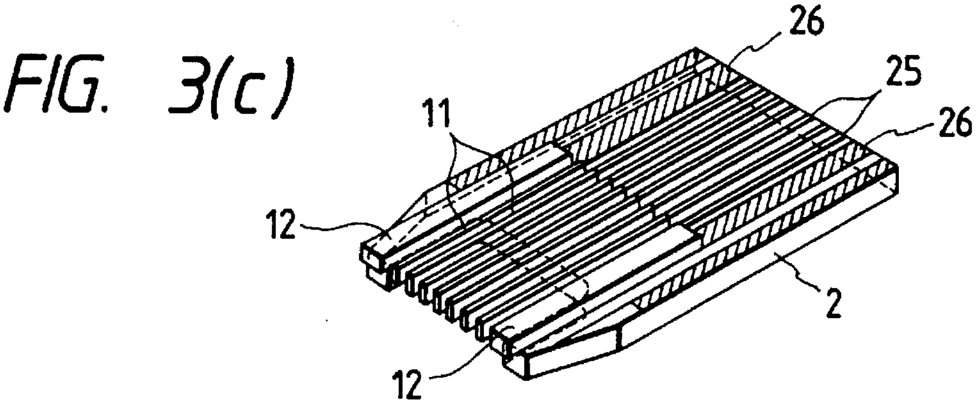
Figure 3D:
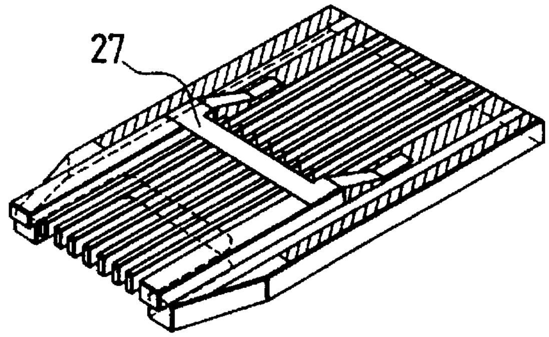

FIGS. 1 and 2 illustrate an ink jet recording head according to a first embodiment of the invention. The ink jet recording head, includes a plate-shaped lamination-type piezoelectric element 1 which, as will be described later, is cut into rectangular pieces which are mounted on a fixing plate 2 to provide a large number of vibrators 11. A holding frame 3 holds the vibrators 11 and positions them in the surface direction of a cavity unit 5. The cavity unit 5 is positioned and held onto the holding frame 3 by a positioning pin 34. Reference numeral 38 denotes a cover which supports the outer peripheral portion of the cavity unit 5. Reference numerals 28 and 29 designates a lead frame; and reference numeral 9 indicates a head circuit board.

Figure 4:
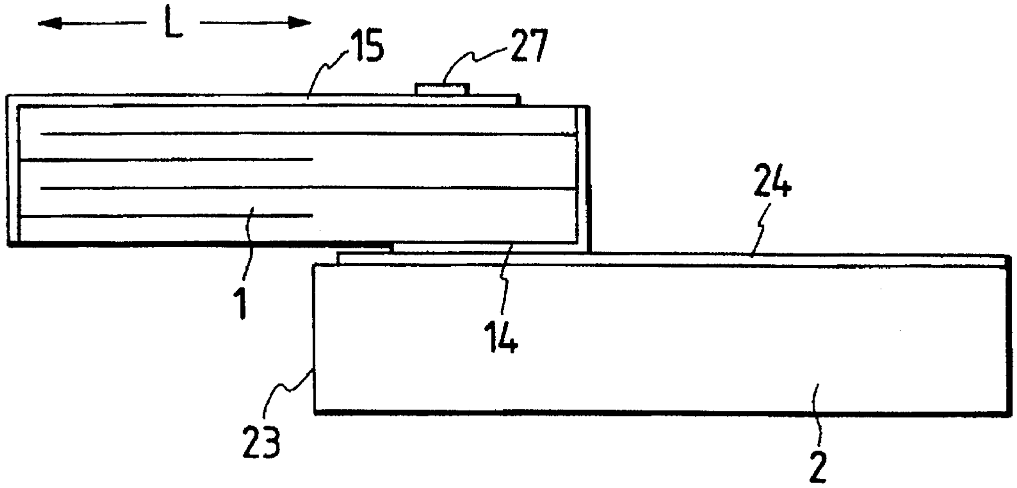
FIG. 4 is an explanatory view of a connection relationship between a piezoelectric vibrator and a fixing plate.

FIGS. 3(*a*) to 3(*d*) and 4 illustrate the piezoelectric element 1 and fixing plate 2. The fixing plate 2 is formed of free-cutting ceramics or the like, and includes an electrode 24 on the top surface thereof. The fixing plate 2 is substantially of a U-shape having portions 22 protruded from both ends thereof. The plate-shaped piezoelectric element 1 has an electrode 14 on the lower surface and the rear end face thereof (see FIG. 4). The piezoelectric element 1 is firmly adhered to the fixing plate 2 in such a manner that the leading edge of the piezoelectric element 1 is protruded from an edge 23 by a given length for keeping an active length L constant, and also the electrode 14 on the lower surface of the element 1 are in contact with the electrode 24 of the fixing plate 2.

The piezoelectric element 1 is formed to have a width which is greater than the length of a corresponding nozzle array. After it is fixed to the fixing plate 2, the piezoelectric element 1 is sliced into a plurality of vibrators 11, and two vibrator-positioning members 12 each pitch between vibrators having a width corresponding to the pitch of a nozzle 61 (see FIG. 6), by use of a slicing machine such as a wire saw or the like (see FIG. 3(*c*)). In this case, two rectangular parts respectively formed on the two outermost sides of these vibrators 11 are used as vibrator-positioning members 12. The vibrator positioning members 12 serve to absorb any deformation of the two side ends of the vibrators which occurs during the slicing operation, and to protect the thin vibrators 11.

Also, the electrode 24, disposed on the surface of the fixing plate 2 whose positioning member 22 serves to supplement the vibrator-positioning member is cut into a large number of signal electrodes 25, which respectively correspond to the vibrators 11, during the slicing operation. The signal electrodes 25 are connected to respective lead wires 29, and lead wires 29 are connected to the head circuit board 9 (see FIG. 1). On the other hand, two common electrodes 26 are respectively connected to the lead frames 28 which extend to the head circuit board 9. A thin conductive film such as flexible cable or metal plate is electrically attached electrode 15 of each vibrators 11 and both ends of film 27 is connected to the common electrodes 26.

Referring again to FIGS. 1 and 2, the holding frame 3, which positions and holds the vibrators 11 and the fixing plate 2, is formed of an epoxy resin or other material in a cylindrical shape having a skirt like portion 31 which fans out at the bottom. The skirt like portion 31, more particularly, the interior of the skirt portion 31, receives the respective lead wires 28 and 29, and the head circuit board 9 is mounted onto the bottom of the skirt like portion 31 in a stable manner.

In the drawings, reference numeral 36 designates an inclined guide surface which is formed so as to taper toward the positioning hole 33 so as to facilitate the insertion of the piezoelectric element 1.

Figure 5:
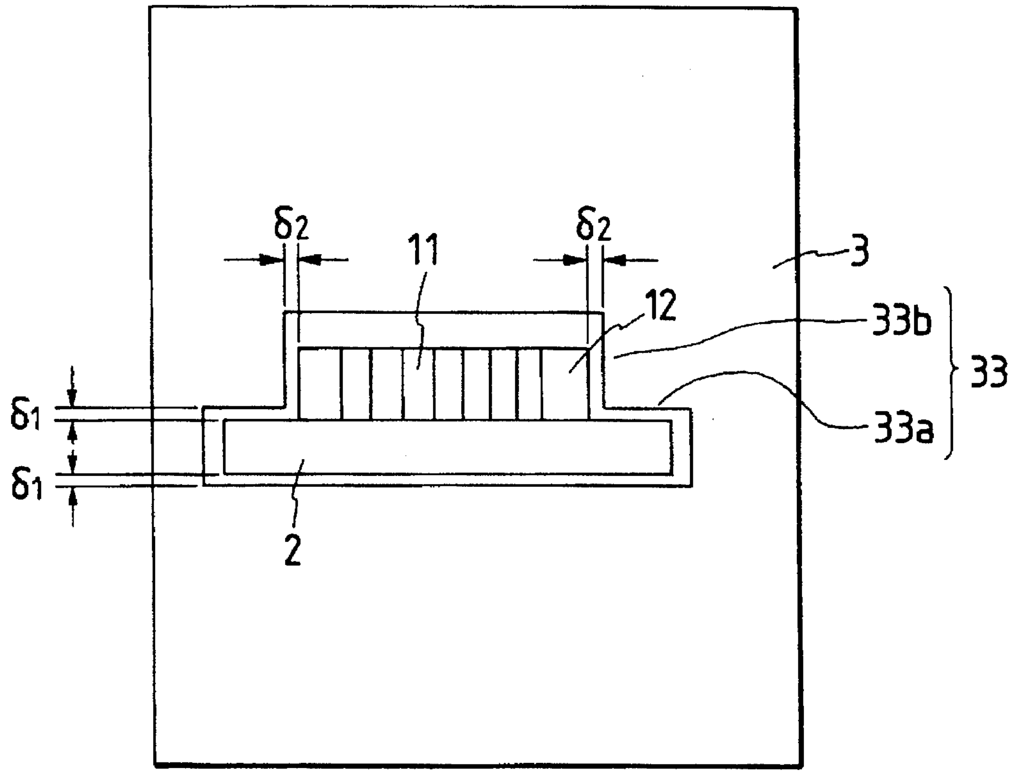
FIG. 5 is a plan view of a positioning hole according to a first embodiment of the invention.

The holding frame 3, which holds the piezoelectric element 1 and the fixing plate 2, has a positioning hole 33 on the top surface 32 (see FIGS. 1 and 5). The positioning hole 33 includes a wide portion **33*a* into which the fixing plate 2 can be fitted with a slight clearance δ in the thickness direction thereof, and a narrow portion 33*b* into which the vibrators 11 can be fitted with a slight clearance 61 in the width direction thereof. The wide portion 33*a* is used to position the fixing plate 22 in the thickness direction, and also the narrow portion 33*b* is used to position the piezoelectric vibrators 11 in the width direction thereof, whereby the piezoelectric vibrators 11 can be accurately positioned in the surface direction of the cavity unit 5**.

Figure 7:
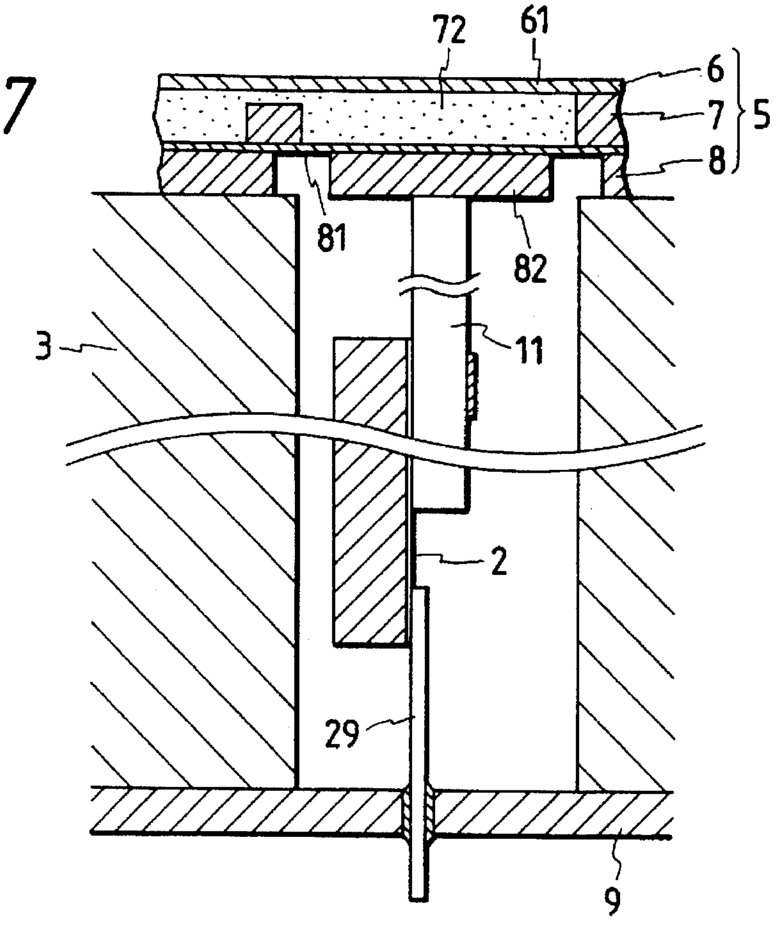
FIG. 7 is a sectional view of main portions of the ink jet recording head.

As illustrated in FIG. 7, the cavity unit 5 to be positioned and held on the top surface 32 of a holding frame 3 with a positioning pin 34 includes a nozzle plate 6 having a nozzle 61 formed therein, a flow passage plate 7 defining an ink flow passage, and an elastic plate 8.

Figure 6:
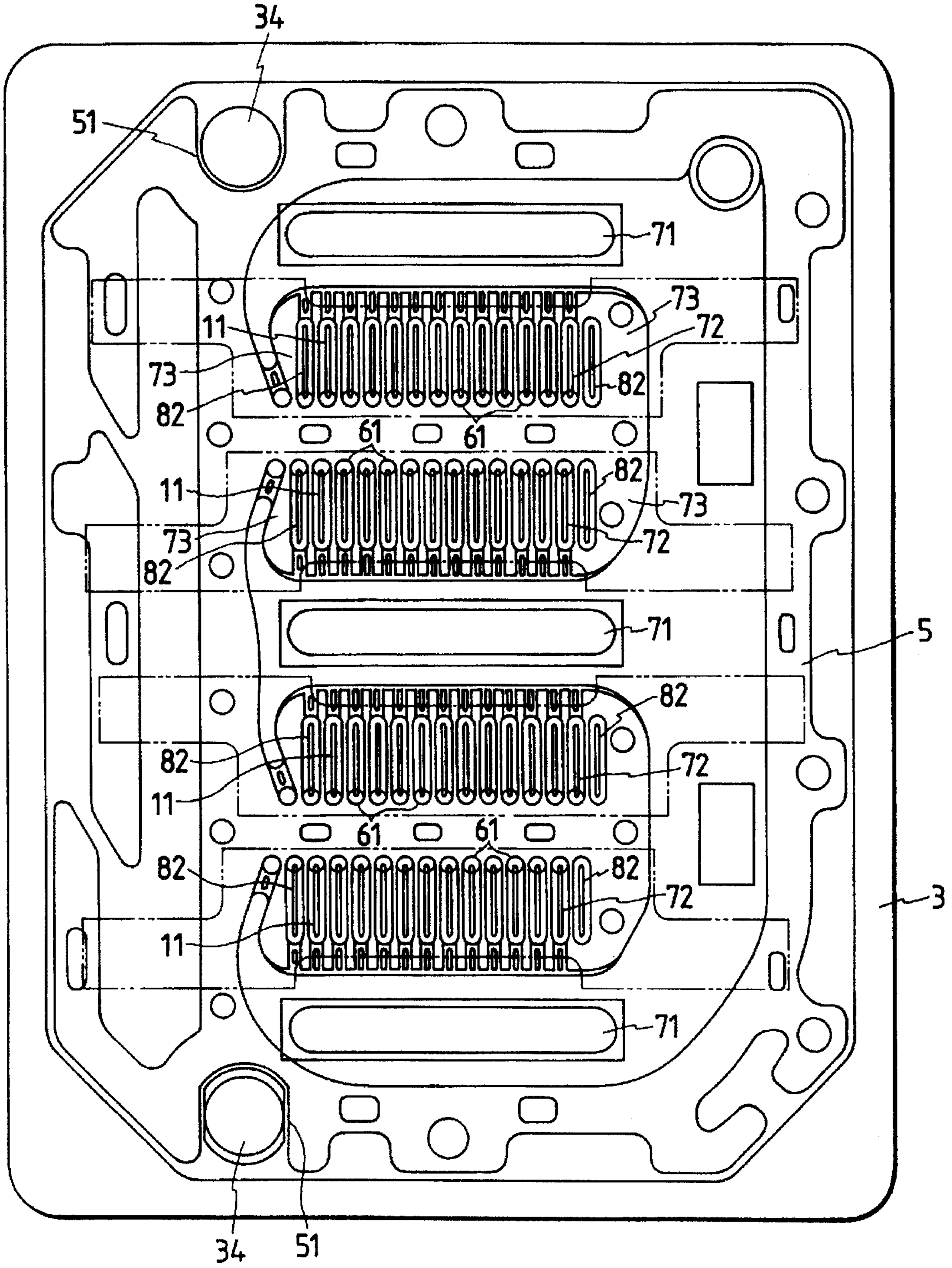
FIG. 6 is a plan view of a cavity unit employed in the invention.

As shown in FIG. 6, the nozzle plate 6 employed in the present embodiment includes two sets of nozzles, each consisting of two arrays of nozzles, each array consisting of 12 nozzles 61 (only some of which are indicated). It should be noted that the vibrator-positioning member 12 do not have a nozzle associated therewith. Also, the flow passage plate 7 which is formed of a photo-curable resin is placed on the nozzle plate 6. The flow passage plate 7 includes 4 arrays of pressure chambers, each array consisting of 12 pressure chambers 72. Each of the pressure chambers 72, which are formed in a rectangular shape, are in communication with a common ink chamber 71. Specifically, the nozzles 61 are respectively in communication with the ends of the pressure chambers 72 which are disposed so as to correspond thereto.

Figure 8:
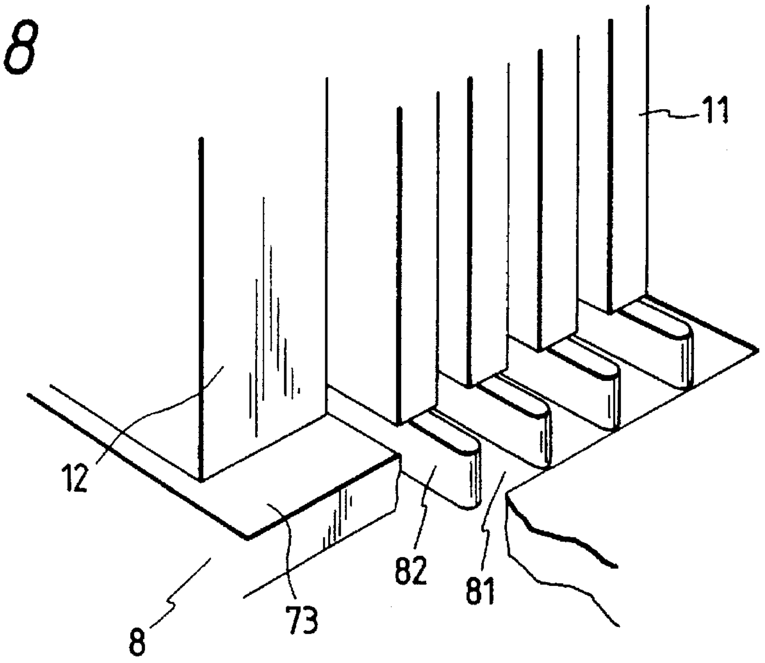
FIG. 8 is a view of a connecting portion between a piezoelectric vibrator and an elastic plate.

Also, the elastic plate 8, which is placed on the surface of the flow passage plate 7, is formed of a thin plate such as an electroforming nickel product or the like. The elastic plate 8 includes a plurality of ring-shaped thin portions 81 which extend along the inner edges of the respective pressure chambers 72. Further, as shown in FIG. 8, in the portions of the elastic plate 8 surrounded by the thin portions 81, there are formed high rigid thick portions 82 which abut against the leading ends of the vibrators 11. Each of the thick portions 82 is arranged such that it has a width smaller than the thickness of the vibrator The thin portions 81 and the thick portions 82 can be formed separately from each other. Alternatively, the thick portions 82 may be formed by forming a plating or a resin layer on a thin film 81.

As shown in FIGS. 2 and 6, if recessed or holed portions 51 respectively formed in the cavity unit 5 are fitted with two positioning pins 34 respectively projecting from the top surface of the holding frame 3 to thereby position the cavity unit 5 relative to the holding frame 3 accurately. Also, as shown in FIG. 1, the respective leading ends of the vibrator-positioning member 12 provided on both outermost portions of the vibrators 11 are abutted against flat surfaces 73 of the elastic plate 8 disposed on both sides of the pressure chamber 72 so that the cavity unit 5 and the vibrators 11 are positioned accurately in a direction along which the vibrators 11 are displaced.

In the ink jet recording head constructed in the above-mentioned manner, the piezoelectric element 1 is bounded to the fixing plate 2 such that the front edge of the element 1 is projected out to a given length from an edge 23 of the fixing plate 2 (see FIG. 3(*a*) and 3(*b*)). Subsequently, the piezoelectric element 1 is cut and divided into a large number of portions to thereby provide vibrators 11 and two vibrator-positioning members 12.

Next, the piezoelectric element 1 or fixing plate 2 must be strongly fixed to holding frame 3 by interposing an adhesive in the clearance of the holding frame 3 in order to control the vibratory movements of the fixing plate 2. epoxy adhesive having an excellent fusing property is desirable when the holding frame is formed of an epoxy resin and the fixing plate 2 is formed of a ceramics.

Figure 10:
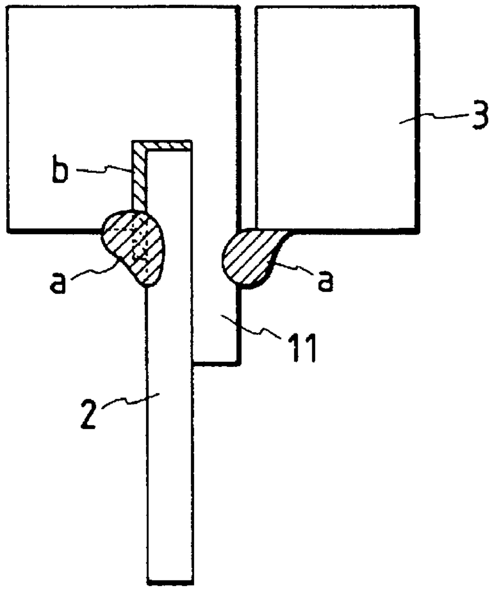
FIG. 10 is a view of a connecting portion between a piezoelectric vibrator, a fixing plate and a holding frame.

When such an adhesive is heated so that it can be quickly hardened, the leading ends of the vibrators 11 draw back or draw out with reference to the top surface of the holding frame 3 due to the different materials and shapes between vibrators 11 and the fixing plate 2, the holding frame 3. For this reason, in the present embodiment, as shown in FIG. 10, a UV-curing adhesive a is at first coated on the connecting portion as a provisional adhesive. That is, the UV adhesive a is applied to the connecting portion and then is irradiated with ultraviolet rays to be hardened. Subsequently, an epoxy adhesive b is injected between the holding frame 3 and the fixing plate 2 to thereby firmly bond the fixing plate 2 to the holding frame 3 under lower temperature or room temperature. The cavity unit 5 is then mounted in such a manner that the recessed portions 51 thereof are engaged with the respective positioning pins 34 projecting from the holding frame 3. Next, outside of two vibrator-positioning member are fitted into the positioning hole 33 formed in the top surface 32 of the holding frame 3 to thereby position the vibrators 11 in the widthwise direction thereof. At the same time, the vibrators 11 are positioned in the thickness direction thereof by means of the fixing plate 2. Further, the respective leading end portions of the vibrator-positioning member 12 are abutted against the flat surface 73 provided on both sides of each pressure chambers array through the elastic plate 8, thereby positioning the vibrators 11 and the cavity unit 5 in the displacement direction thereof.

Figure 9:
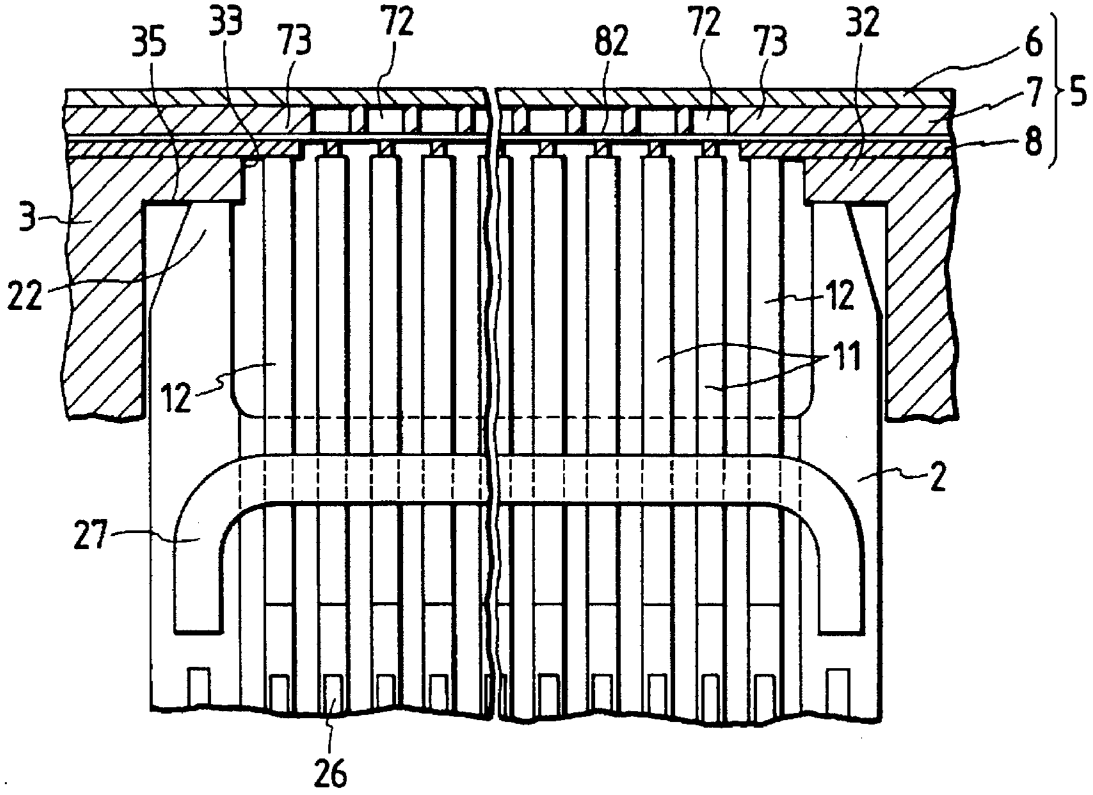
FIG. 9 is a sectional view of the ink jet recording head according to another embodiment of the invention.

FIG. 9 illustrates another embodiment of the invention, which relates to the positioning of the vibrators 11 and the cavity unit 5 in the displacement direction. In this embodiment, instead of the vibrator-positioning member 12 used in the above-mentioned embodiment; the positioning member 22 on the leading end of the fixing plate 2 is abutted against a positioning step 35 of the holding frame 3 so that the vibrators 11 is positioned in the displacement direction with accuracy.

Figure 11:
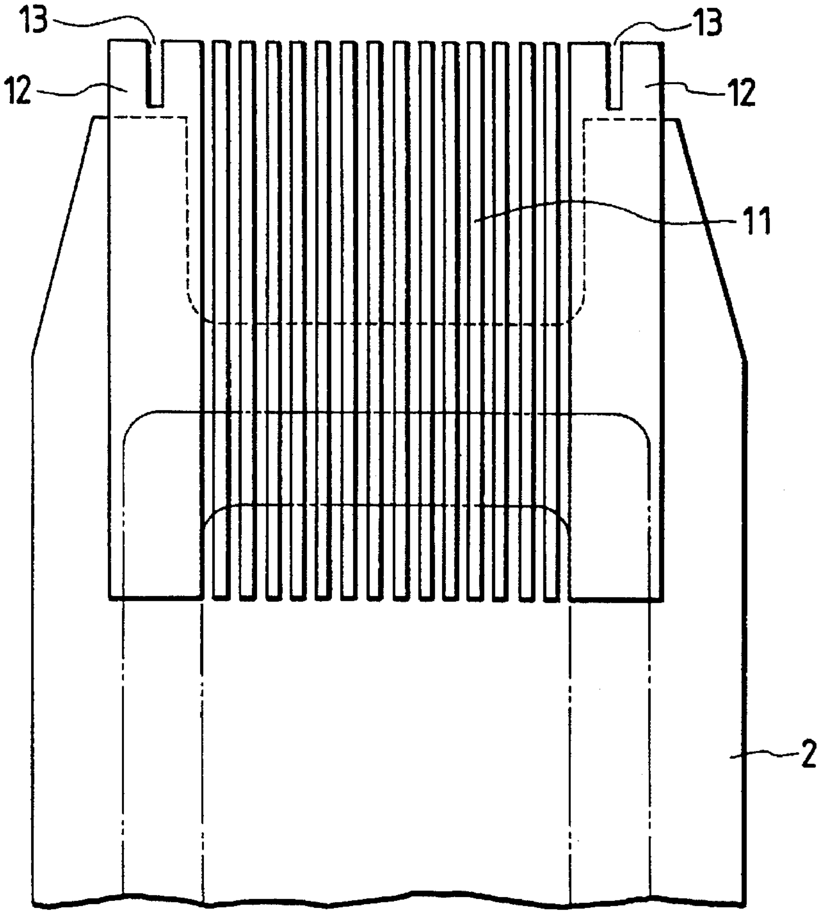
FIG. 11 is a plan view of a piezoelectric vibrator according to third embodiment.

FIG. 11 illustrates a third embodiment of the invention, which relates to the mutual positioning of the vibrators 11 and the cavity unit 5. In this embodiment, the widths of the vibrator-positioning member 12 to be provided on the two outermost sides of the vibrators 11 are widened and slits 13 are formed at the accurate position with reference to the vibrators in the leading end faces thereof, so that the positioning pins provided on the lower surface of the elastic plate 8 can be fitted into the slits 13, respectively.

According to the third embodiment, the vibrators 11 and the cavity unit 5 are directly connected to each other to thereby be able to enhance their mutual positioning accuracy in the surface direction.

Figure 12:
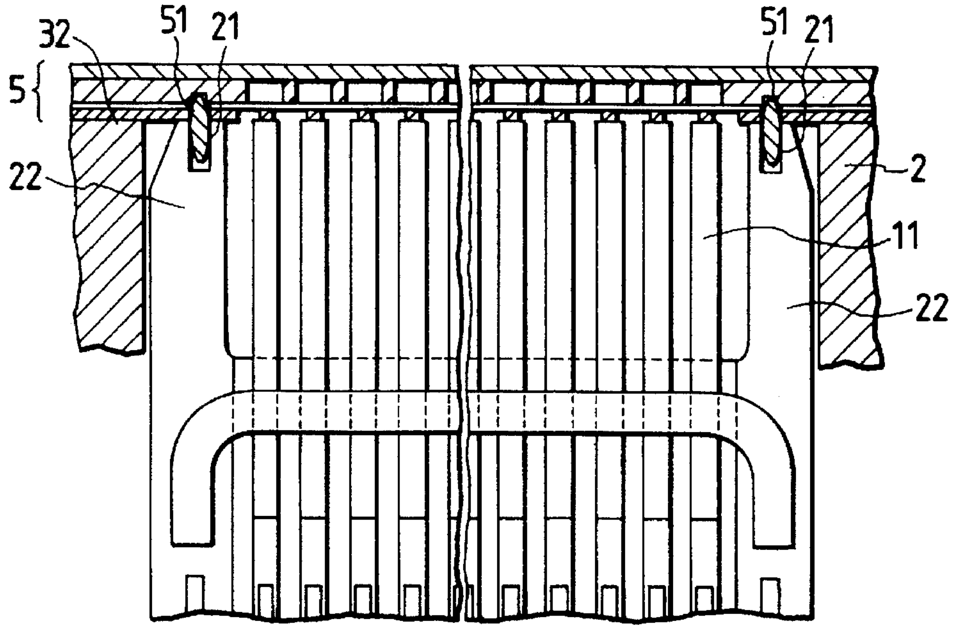
FIG. 12 is a section view of the ink jet recording head according to fourth embodiment.

FIG. 12 illustrates a fourth embodiment, which relates to the positioning of the vibrators 11 and cavity unit 5. In the fourth embodiment, the front edge of a plate-shaped piezoelectric element t is arranged so as to project a distance which corresponds to the leading ends of two positioning portions 22 provided on the two sides of a fixing plate 2, and then the piezoelectric element 1 and the fixing plate 2 are bonded to each other. Subsequently, the piezoelectric element 1 is cut and divided into a large number of vibrators 11, so that the leading ends of the respective vibrators 11 can be matched to the positioning portions 22 with accuracy.

According to this embodiment, the vibrators 11 are positioned in surface direction using slit 21 and pin 51, and positioned in displace direction when placing ends of the positioning portions 22 with the elastic plate 8.

Figure 13:
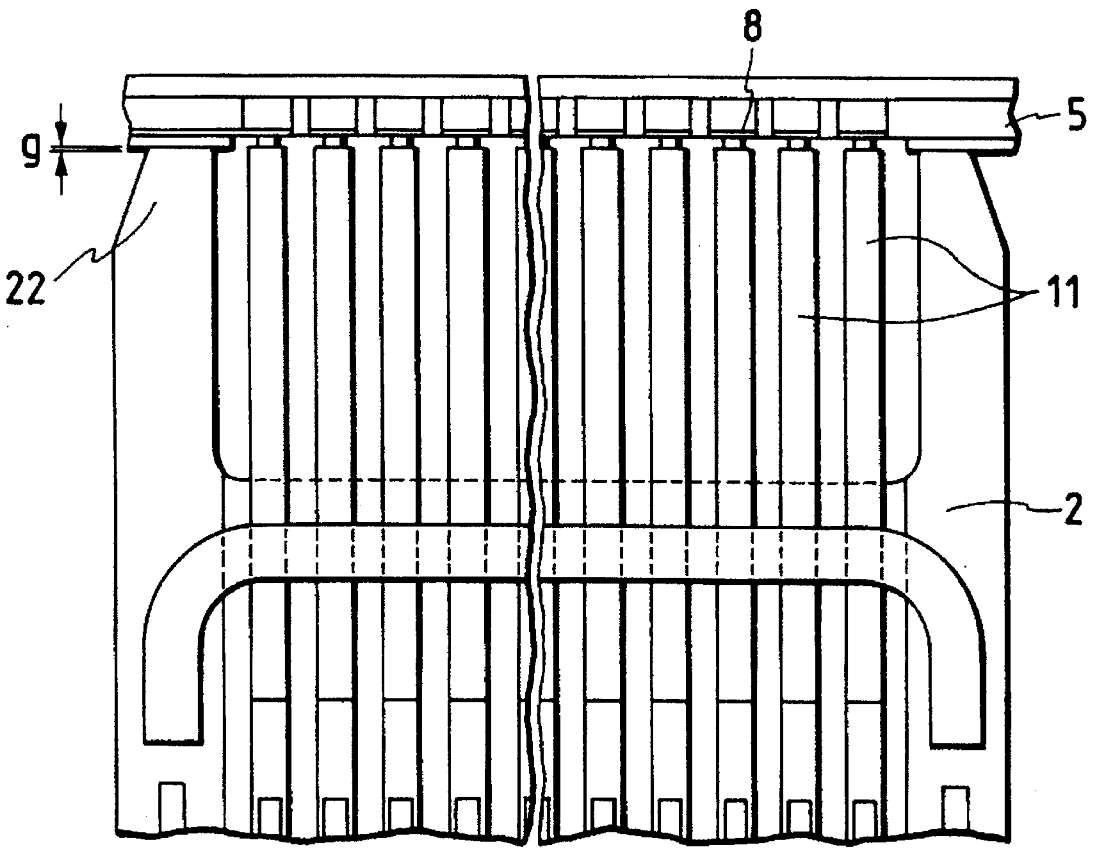
FIG. 13 is a sectional view of a fifth embodiment of an ink jet recording head according to the invention.

FIG. 13 illustrates a fifth embodiment of the invention in which the front edge of a piezoelectric element 1 is projected out a slight length g beyond the leading ends of two positioning potions 22 respectively provided on the two side portions of a fixing plate 2 and then the piezoelectric element 1 and fixing plate 2 are bonded to each other. Subsequently, the piezoelectric element 1 is cut and divided into a large number of vibrators 11. According to the fifth embodiment, when a cavity unit 5 is mounted to the leading ends of the two positioning portions 22, which function as a reference for positioning, on the two side portions of the fixing plate 2, then the leading ends of the vibrators 11 are strongly abutted against an elastic plate 8 in such a manner that the elastic plate 8 is slightly flexed toward a pressure chamber 72. Accordingly, the thickness of an adhesive to be applied to the leading ends of the vibrators 11 can be reduced. Alternatively, this may be omitted.

Figure 14A:
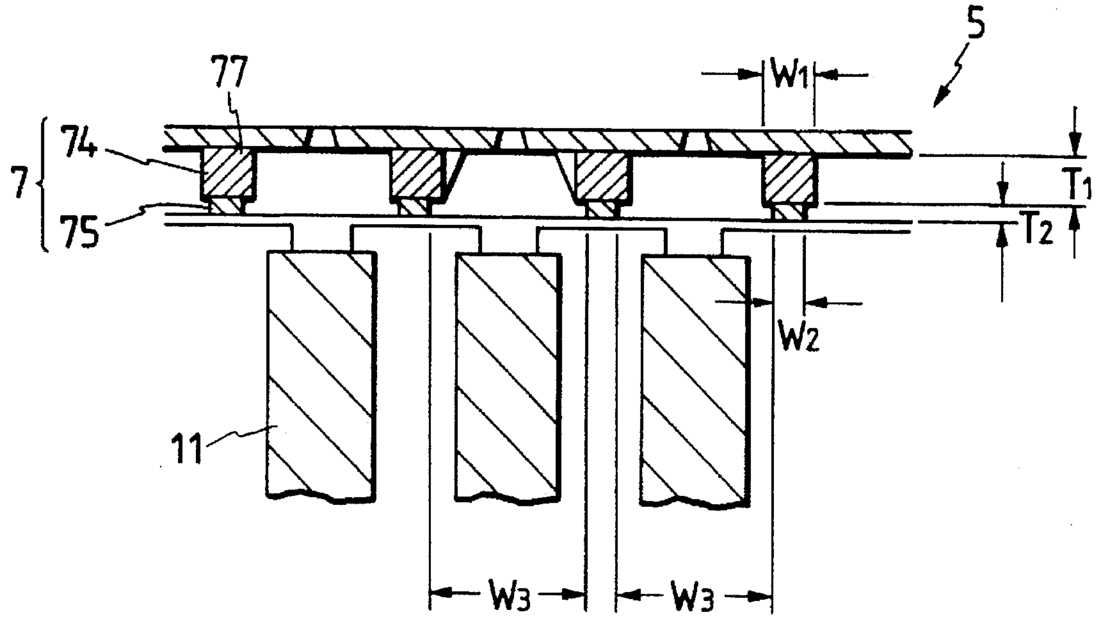
FIGS. 14(*a*) and 14(*b*) are sectional views of a sixth embodiment of a cavity unit according to another embodiment.
Figure 14B:
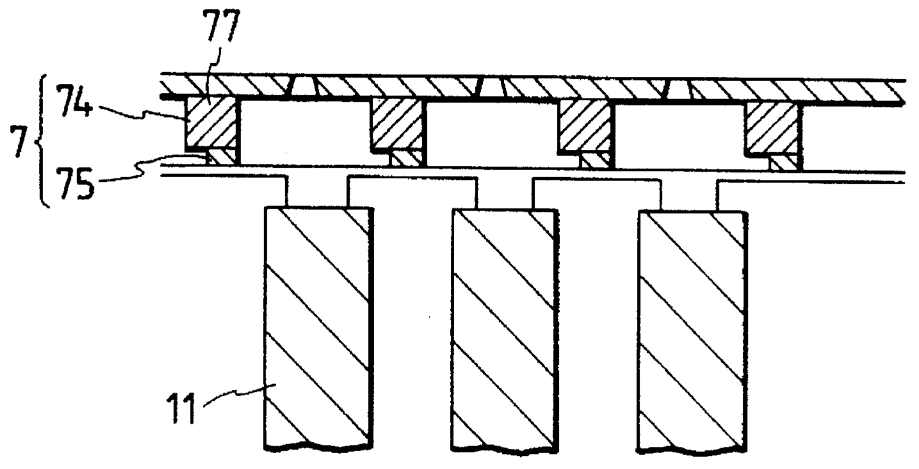

FIGS. 14(*a*) and 14(*b*) illustrate a sixth embodiment of a cavity unit 5 according to the invention. In the sixth embodiment, the chamber partition wall 77 of the flow passage plate 7, which defines an ink flow passage, is composed of a thick layer 74 and a thin layer 75, and the thick layer 74 is arranged to have a wide width W1 and the thin layer 75 is arranged to have a narrow width W2.

According to the sixth embodiment, even if the two layers 74 and 75 are slightly shifted in position in the surface direction thereof when they are connected together in the manufacturing process, as shown in FIG. 14(*b*), the area of the connecting surface thereof remains unchanged so that the rigidity of the wall 77 can be maintained. Also, by uniformly setting a ratio T/W of the thicknesses T1, T2 and widths W1, W2 of the two layers 74, 75, the rigidity is enhanced to thereby ensure stable ink jetting.

According to this embodiment, there is a still more advantage that we can keep a wide span W3 of the pressure chamber without decreasing a rigidity of wall, then we can get a large volume of ink droplet even if in the case of high density pressure chamber.

Figure 15:
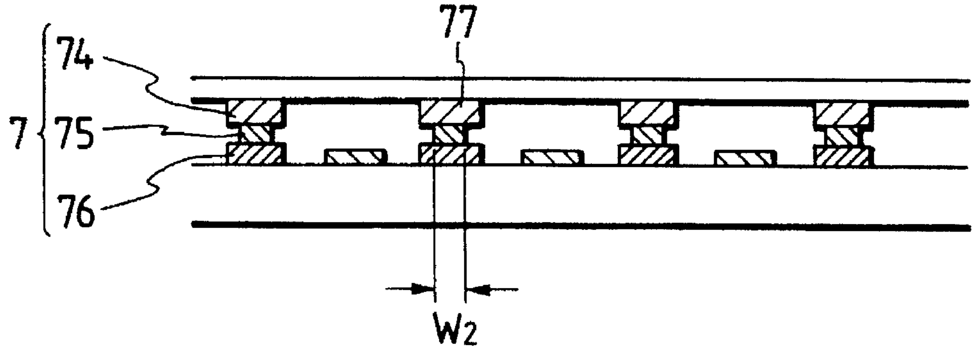
FIG. 15 is a sectional view of a seventh embodiment of a cavity unit according to still another embodiment.

FIG. 15 illustrates a seventh embodiment in which a flow passage plate 7 is composed of three layers 74, 75, 76, and the width W2 of the middle layer 75 is set narrower than those of the remaining layers. Accordingly, even if the three layers are shifted in the surface direction thereof when they are connected together, the strength and rigidity of the wall can be maintained constant.

The invention has been described through preferred embodiments thereof. However, it will be apparent to those skilled in the art that various modifications can be made without departing from the scope of the invention as defined by the appended claims.

What is claimed is:

1. A process for forming an ink jet recording head wherein the movement of a piezoelectric element moves part of an ink flow passage substrate so as to jet out ink stored therein, said process comprising the steps of:

attaching a plate shaped piezoelectric element to a fixing plate;

cutting said piezoelectric element into a plurality of piezoelectric vibrators;

mounting an ink flow passage substrate on a holding device;

inserting said piezoelectric vibrators, mounted on said fixing plate, into said holding device so as to allow said piezoelectric vibrators and said ink flow passage substrate to be brought into contact therebetween;

engaging a vibrator positioning member with said ink flow passage substrate and said holding device so as to regulate the relative position thereof.

2. A process for forming an ink jet recording head wherein the movement of a piezoelectric element moves part of an ink flow passage substrate so as to jet out ink stored therein, said process comprising the steps of:

attaching a plate shaped piezoelectric element to a fixing plate;

cutting said piezoelectric element into a plurality of piezoelectric vibrators;

inserting said piezoelectric vibrators, mounted on said fixing plate, into a holding device;

mounting an ink flow passage substrate on said holding device so as to be in contact with said piezoelectric vibrators;

assembling said ink flow passage substrate and said holding device to regulate the relative position thereof.

3. A process for forming an ink jet recording head as recited in claim 1, further comprising the steps of:

widening widths of the two outermost of said vibrators to define said vibrator positioning member;

forming slits in leading end faces of said two outermost of said vibrators; and fitting an elastic plate into said slits.

4. A process for forming an ink jet recording head wherein movement of a piezoelectric element moves part of an ink flow passage substrate so as to jet out ink stored therein, said process comprising the steps of:

arranging a front edge of a plate-shaped piezoelectric element so as to project a distance which corresponds to leading ends of two positioning portions provided on the two sides of a fixing plate;

bonding said piezoelectric element and said fixing plate to each other; and cutting and dividing said piezoelectric element into a large number of vibrators so that leading ends of said respective vibrators are matched to said positioning portions with accuracy.

5. A process for forming an ink jet recording head wherein the movement of a piezoelectric element moves part of an ink flow passage substrate so as to jet out ink stored therein, said process comprising the steps of:

attaching a plate shaped piezoelectric element to a fixing plate;

cutting said piezoelectric element into a plurality of piezoelectric vibrators;

mounting an ink flow passage substrate on a holding device;

engaging vibrator positioning member with said ink flow passage substrate and said holding device so as to regulate the relative position thereof; and inserting said piezoelectric vibrators, mounted on said fixing plate, into said holding device so as to allow said piezoelectric vibrators and said ink flow passage substrate to be brought into contact therebetween.

6. A process for forming an ink jet recording head as set forth in claim 1, wherein said engaging step further comprises using selected ones of said piezoelectric vibrators as the vibrator positioning member and coupling said vibrator positioning member to portions of said ink flow passage substrate which do not have an ink flow passage associated therewith.

7. A process for forming an ink jet recording head as set forth in claim 5, further comprising:

forming a signal electrode on each of said piezoelectric vibrators.

8. A process for forming an ink jet recording head as set forth in claim 2, further comprising forming positioning portions on a top surface of said holding device said positioning portions being engaged with said piezoelectric vibrators in said inserting step so as to define a relative position between said holding device and said piezoelectric vibrators.

9. A process for forming an ink jet recording head as set forth in claim 2, further comprising inserting an epoxy adhesive combined with an adhesive of an ultraviolet-curable type in a connecting portion gap defined between said holding device and said fixing plate.

10. A process for forming an ink jet recording head as set forth in claim 1, wherein both sides of a pressure chamber defined in said ink flow passage substrate are wall elements, said process further comprising coupling said wall elements to said vibrator-positioning member so as to position said vibrator-positioning member in the displacement direction of said piezoelectric vibrators.

11. A process for forming an ink jet recording head as set forth in claim 1, wherein said ink flow passage substrate is composed of at least two layers, said process further comprising defining widths of the partition walls which define ink flow passages respectively formed in said layers to be different from one another.

12. A process for forming an ink jet recording head as set forth in claim 1, wherein said attaching step comprises forming a flat layer on the surface of said fixing plate, placing said flat layer in contact with said piezoelectric vibrators and said ink flow passage substrate, to allow said piezoelectric vibrators to be connected with each other by virtue of said flat layer after said cutting step.

13. A process for forming an ink jet recording head as claimed in claim 1, further comprising positioning said vibrator-positioning member on both sides of said plurality of piezoelectric vibrators.

14. A process for forming an ink jet recording head as set forth in claim 5, wherein said engaging step further comprises using selected ones of said piezoelectric vibrators as the vibrator positioning member and coupling said selected ones of said piezoelectric vibrators to portions of said ink flow passage substrate which do not have an ink flow passage associated therewith.

15. A process for forming an ink jet recording head as set forth in claim 5, further comprising forming positioning portions on a top surface of said holding device, and engaging said positioning portions with said piezoelectric vibrators so as to define a relative position between said holding device and said piezoelectric vibrators.

16. A process for forming an ink jet recording head as set forth in claim 5, wherein both sides of a pressure chamber defined in said ink flow passage substrate are wall elements, said process further comprising coupling said wall elements to said vibrator positioning member so as to position said vibrator positioning member in the displacement direction of said piezoelectric vibrators.

17. A process for forming an ink jet recording head as set forth in claim 5, further comprising forming said vibrator positioning member on both sides of said plurality of piezoelectric vibrators.

* * * * *